(No Model.)
H. I. BLITS.
APPARATUS FOR PRESERVING FRUITS.
No. 507,778. Patented Oct. 31, 1893.
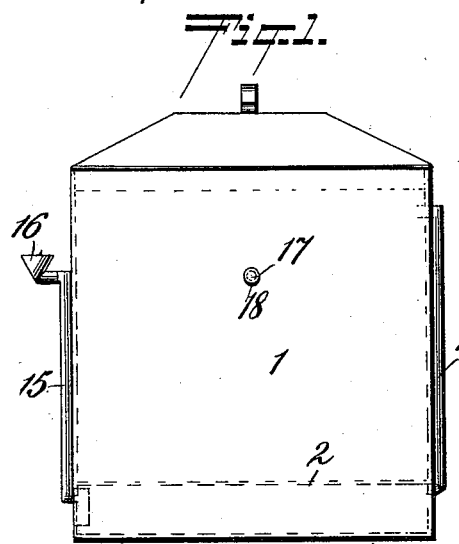
Fig. 1.
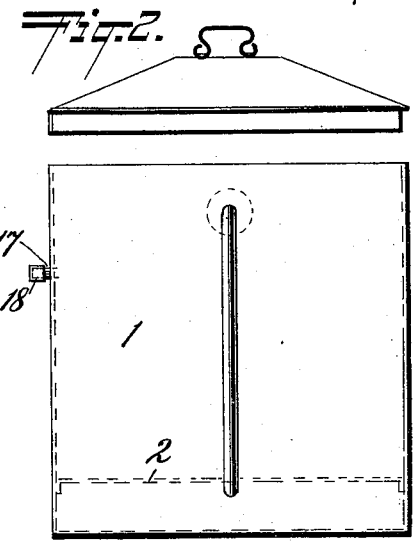
Fig. 2.
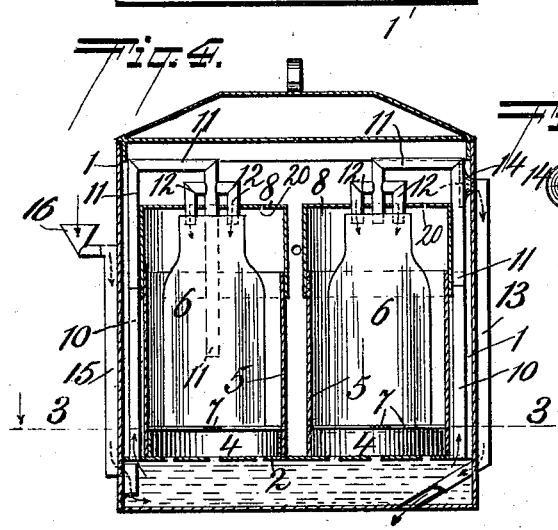
Fig. 4.
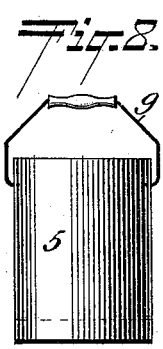
Fig. 5.
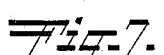
Fig. 6.
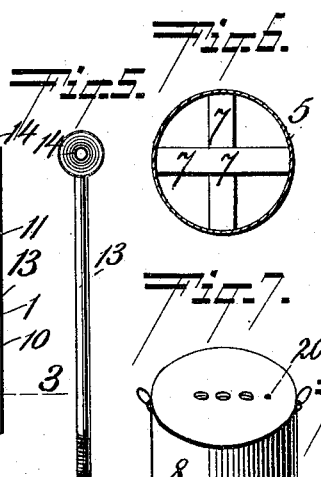
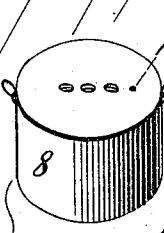
Fig. 7.
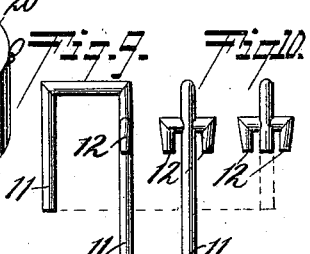
Fig. 8.
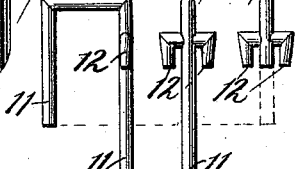
Fig. 9. Fig. 10.
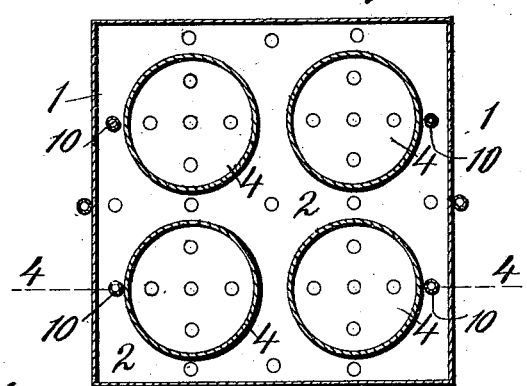
Fig. 3.
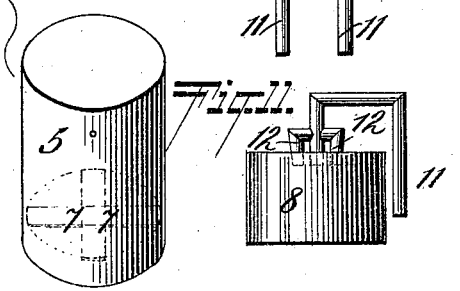
Fig. 11.
Attest:
H. H. Schott
D. N. Naylor
Inventor
H. I. Blits
By A. H. Ruff
Atty

UNITED STATES PATENT OFFICE.

HARRY I. BLITS, OF NEW YORK, N. Y.

APPARATUS FOR PRESERVING FRUITS.

SPECIFICATION forming part of Letters Patent No. 507,778, dated October 31, 1893.

Application filed June 27, 1893. Serial No. 478,979. (No model.)

*To all whom it may concern:*

Be it known that I, HARRY I. BLITS, of New York, in the county of New York and State of New York, have invented certain new and useful Improvements in Mechanism and Processes for Preserving Fruits, Vegetables, &c.; and I do hereby declare the following to be a full, clear, and exact description of the invention, such as will enable others skilled in the art to which it appertains to make and use the same.

This invention has for its objects to preserve fruits, vegetables, meats and other perishable articles of food effectually and expeditiously, and in such manner as to prevent shrinkage, loss of flavor and color, and to enhance the keeping qualities of the articles, and in such manner that one half to two thirds of the time ordinarily consumed will be saved.

In the drawings, in which like reference numerals indicate like parts in the respective views, Figure 1— represents a side elevation of the outer casing of the apparatus forming part of my invention. Fig. 2— represents an end elevation thereof showing the cap or cover of the same. Fig. 3— represents a horizontal sectional view of the complete apparatus; Fig. 4— a vertical longitudinal sectional view thereof; Fig. 5— a detached view of an escape pipe forming part of the apparatus; Fig. 6— a horizontal sectional view of one of a series of can receptacles forming part of my invention; Fig. 7— perspective views of such receptacle and its cover; Fig. 8— a side elevation of the receptacle, showing the bail or handle by which it is manipulated; Fig. 9— detached views of a siphon which conveys the steam into the cans; Fig. 10— a detached view of a modified form of said siphon, and Fig. 11— a side elevation of the receptacle cap or cover, showing the method of applying said tubes.

Referring to the drawings the numeral 1 indicates the outer shells of the apparatus which is made of sheet metal, preferably tin-plate, with a copper bottom, and of rectangular shape, although it may be constructed of other shapes, if convenient.

The numeral 2 indicates a false bottom constructed of sheet metal and properly supported within the shell, at a suitable distance above its bottom. The said false bottom is perforated as shown in Fig. 3, and to its top is secured by soldering or otherwise, a series of short perforated cylinders 4. A jar 6 rests upon a strip 7 in a receptacle or holder 5, which fits over each short cylinder 4. The said receptacles are provided with the adjustable caps 8 having exhaust vent 20 so constructed as to retain and compress the steam so as to treat any desired quantity—*i. e.* pints, quarts, or two quarts, &c.; the same having handles by which they may be removed, and are also provided with bails by which they can be conveniently manipulated. The covers are each provided with three apertures in the top, for the insertion of a steam conveying siphon for heating the contents of the jars. These siphons are two or more in number and are designated by the numerals 10, 11, and 12. They are constructed of metal, and extend from suitable openings in the false bottom on opposite sides, upwardly over the receptacles, and then downwardly through the central openings in the covers of the receptacles. Each of the down turned ends of the tubes is provided with two lateral down turned branches 12, which enter the side apertures in the covers of the receptacles as shown in Fig. 4 of the drawings. The siphons are removable, to permit the insertion of the receptacles and their proper adjustment to the jars. The siphon 11 extends to within about two inches of the bottom of the jar and is adapted to the treating of vegetables and meats only, and without which the desired result cannot be accomplished; the tube 12 extends only a short distance into the mouth, so that the steam may be diffused throughout the body of the material treated, or downward through the same from the top, and is intended to be employed for treating liquids and meats only.

The numeral 13 indicates an escape tube which connects with the interior of the shell down the outside thereof to just below the false bottom, obliquely through the space below the same and through the true bottom, opening externally so as to discharge the escaping products into the fire when the apparatus is in operation. The upper end of this tube extending into the shell is provided with a funnel shaped outlet 14 to collect and direct the escaping products such as steam, &c., to the tube.

The numeral 15 indicates a safety or charging tube by which the boiler or space below the false top is properly charged with water. This extends down one side of the shell to some distance entering the same below the false bottom, and extending downwardly to near the true bottom. This pipe also indicates when the boiler needs refilling by the steam escaping through the same. At its upper end it is provided with a funnel 16 for convenience in filling.

The numeral 17 is a steam indicator consisting of a short tube connecting with the shell near the top and provided with a detachable cap 18, the operation of which will be explained hereinafter.

In an apparatus of the above construction there never can be an excessive pressure of steam nor can the temperature be increased much over 212° Fahrenheit on account of the escape marked 14 and there can be no breakage of jars as there is a vent in the cap through which the siphons pass, and the jars are always tempered in the steam box, fifteen minutes before treatment. I have shown my invention as carried out with four jars. The apparatus can be enlarged according to the capacity desired.

I do not claim as new the canning of fruits and other matter in glass jars in a steam box or the confining of steam in a narrow cylinder (or steam jacket) in which by actual experiment with all steamers in use I find it takes twelve to fifteen minutes from the time steam is generated for berries, twenty to thirty minutes for fruits, forty-five minutes for tomatoes, and from two and one-half to three hours for vegetables and meats. By combining two steamers I get a much better result, increasing the volume of steam, getting the double action of the same, compressing the steam better and circulating same within and without. By this improvement, I can treat berries in ten minutes, all fruits in from twelve to fifteen minutes, tomatoes in thirty-five minutes, and vegetables in one hour and a half, thereby saving time, labor, and fuel, causing less shrinkage and leaving a perfectly natural flavor. The introduction of the siphon, as shown, enables the steam to be carried into the jars, thereby securing a more equal distribution of heat and a greater degree of heat, killing the bacteria and forcing out the air quicker and expeditiously and effectually expelling the carbonic acid gas which exists largely in vegetables; thereby treating all matter in from one-half to two-thirds less time than it takes by the other methods, such as the sterilizing in a boiler of water, canning in a steamer or treating them in a steam jacket, or the hot air process, patented by me February 9, 1887, No. 378,999.

I find that by combining the siphon with my steamer I now can treat liquids and berries in five minutes, fruits in from seven to ten minutes, tomatoes in twenty minutes and all other vegetables in one hour, and could shorten that time if I could add more siphons; but owing to the poor glass jars now in the market, the glass would not stand this extra heat forced into same, and the fruit would not be as well treated. This retains the natural flavor and condition of the matter treated and saves from one-half to two-thirds in time, fuel, labor and expense, and the siphon 11 cannot be used for fruit processing as it will shrivel and shrink fruit too much.

In using my apparatus, there is a shrinkage of not quite one-sixteenth in vegetables, one-eighth in fruit, and not over one-fourth in berries. Besides in the operation of my apparatus in carrying on the process more rapidly and not increasing the temperature over 212° Fahrenheit I retain their natural state, and flavor much better than with prior apparatus.

My apparatus is employed as follows: Nice prime fruit is placed tightly into jars up to first screw of jar; a sirup of sugar and water to suit the taste is poured over to completely fill jar; the jar is placed in a cylinder bearing on the rests as shown, the cap is placed on, so adjusted that it will not rest on mouth of jar, the fruit siphons are properly adjusted so that the three siphons will extend into the mouth of jar one-fourth or one-half inch and when the steam indicator allows the steam to puff out its cap is attached, and from that time the fruit is treated five minutes, and then the jars are taken out or filled up with hot sirup if necessary, sealed air tight, placed back immediately in cylinder, adjusted cap is put on, and jars are treated five minutes longer without siphon. For tomatoes it takes only twenty to twenty-five minutes processed in the same way, and using the fruit siphons; meats same way; time thirty minutes with siphon and forty minutes closed; no liquid over the meat. Berries and liquids are processed the same way, only the time is three minutes with fruit siphon and two to three minutes sealed air tight. In order to prevent shrinkage, having the berries all raised to the top and losing their color and taste especially in strawberries, mix the amount of sugar to be used with the berries and allow them to stand over night in a refrigerator. This toughens them, fills the pores of the berries and therefore shrinks them very little and gives a good color to them all; berries are then taken out, and more sugar is added to the sirup. The sirup is then brought to a good boil or until it strings and allowed to cool and placed over the berries which are processed in the manner and time hereinbefore specified.

Having thus described my invention, what I claim, and desire to secure by Letters Patent, is—

1. In an apparatus for steaming fruits for preservation, the combination of an outer shell having a suitable cover and a perforated false bottom, the perforated cylinder 4, the jar receptacles having strips to receive the jars provided with perforated tops or covers and the siphons extending from the space below the false bottom through the perforated tops, whereby steam may be admitted directly into the body of the material to be preserved, in the jar, substantially as specified.

2. In an apparatus for steaming fruits for preservation, the combination with a closed cooking chamber, of receptacles provided with siphon tubes having a long arm projecting into the cooking chamber and short arms opening into the receptacle at its top, as herein set forth.

In testimony whereof I have signed this specification in the presence of two subscribing witnesses.

HARRY I. BLITS.

Witnesses:
T. B. FARRELL,
LEO H. GOUDOLF.